Patented June 15, 1948

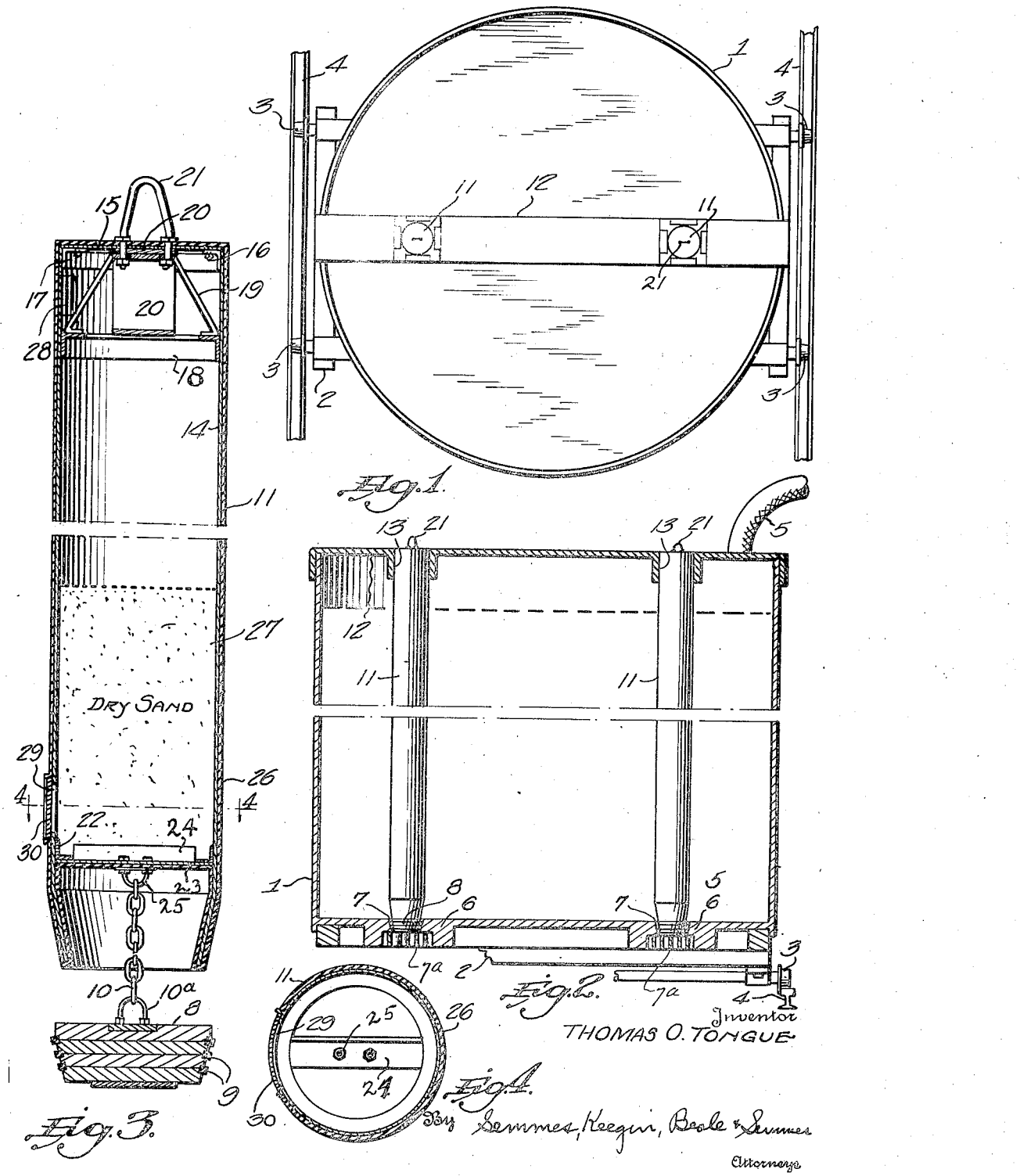

2,443,282

UNITED STATES PATENT OFFICE 2,443,282

METHOD AND APPARATUS FOR REMOVING GEL

Thomas O. Tongue, Baltimore, Md., assignor to The Davison Chemical Corporation, Baltimore, Md.

Application June 7, 1944, Serial No. 539,165

6 Claims. (Cl. 252—359)

This invention relates to the manufacture of a hydrogel and more particularly has reference to the removal of a hydrogel from a vessel in which a hydrosol is converted into a hydrogel.

In the manufacture of a hydrogel, such as silica hydrogel, a hydrosol formed by mixing sodium silicate and sulphuric acid, for instance, may be run into a vessel and allowed to set into a hydrogel. After sufficient setting time has elapsed, the hydrogel may be dug out of the setting vessel and transferred to a washing tank for the removal of the soluble compounds such as sodium sulfate from the gel. The prior art methods of removing the gel from the setting vessel have quite often resulted in considerable damage to the gel and in the production of a large percentage of unusable fines. Moreover, the prior art methods of gel removal have not been as efficient and effective as is desirable, maintaining the cost of the gel product higher than is necessary.

An object of this invention is to provide a method and apparatus for removing a hydrogel from a vessel in which a hydrosol is gelled.

Another object of this invention is to provide a method and apparatus for removing a hydrogel through an opening in the bottom of a vessel in which a hydrosol is converted into a hydrogel.

A further object of this invention is to provide a method and apparatus for removing a hydrogel from a vessel in which a hydrosol is gelled by setting the gel about cores positioned over openings in the bottom of the vessel, breaking up and discharging the gel down through a channel provided by removal of the core and through the opening in the bottom of the vessel.

Still another object of this invention is to provide a core for positioning in a gel setting vessel.

It is also an object of this invention to provide a core and plug combination with a lost motion connection between the core and plug.

With these and other objects in view, as will appear more fully hereinafter, the present invention resides in the parts and combinations and steps and procedure set forth in the following description and illustrated in the drawings.

In order to facilitate an understanding of the present invention, reference is made to the accompanying drawings, in which:

Figure 1 is a plan view of a setting vessel constructed in accordance with the present invention.

Figure 2 is a vertical sectional view of the setting vessel illustrated in Figure 1 of the drawings.

Figure 3 is an enlarged vertical sectional view of the core and associated plug of the present invention.

Figure 4 is a sectional view taken on line 4—4 of Figure 3.

In carrying out the present invention, a hydrosol which may be prepared by mixing sodium silicate and sulfuric acid is introduced into a setting vessel 1. As indicated in the drawings, the setting vessel 1 may be of circular formation and mounted upon a carriage 2 which is provided with flange wheels 3 adapted to run on the track 4. For purposes of the present invention, the setting vessel 1 has been illustrated as being mounted on the carriage 2 for movement along the rails 4, which is an advantage in a commercial installation because a single setting vessel may be used for introducing a hydrogel into a plurality of wash tanks positioned below the level of the rails 4 and in alignment therewith. On the other hand, however, the present invention is not limited to a setting vessel which is movable but is equally applicable to a stationary vessel of any desired cross sectional configuration.

The hydrosol which for purposes of illustration may be a silica hydrosol prepared from sodium silicate and sulfuric acid is introduced into the setting or gelling vessel 1 through a hose or other conduit 5. This hydrogel may be supplied to the conduit 5 from a source such as a mixer, not illustrated.

As illustrated in Figure 2 of the drawings, the bottom 6 of the setting vessel 1 is provided with one or more openings 7 which are closed by plugs 8. Openings 7 and plugs 8 are of tapered formation and the plugs 8 are provided with a plurality of sealing rings 9 to provide a leakproof joint when the plugs are in closed position. Plugs 8 are connected by chains 10 or other lost motion means with cores 11 which are positioned directly over the plug 8 and exert their weight upon the plugs. Cores 11 extend from the plugs 8 up to the upper portion of the setting vessel 1 and are maintained in a truly vertical position in setting vessel 1 by means of a combined core guide and cat-walk 12. As illustrated, the cat-walk 12 is provided with openings 13 which are in vertical alignment with the openings 7 and through which the cores 11 are inserted when being placed in position over the openings 7.

Each plug 8 is of laminated wood construction and is provided with a stainless steel U-bolt 10a by means of which the chain 10 is connected thereto.

The core 11 is formed of a tubular steel body 14, the lower end of which is tapered inwardly to a smaller diameter as shown in Figure 3 of the drawings. A top 15 is positioned on the upper end of the core and is bolted in place by bolts 16 which extend through bracket ring 17 which is welded to the body 14. Another ring 18 of L-shaped cross section is welded to the body 14 a short distance below ring 17. Brackets 19 and 20 have their lower ends welded to ring 18 and their upper portions overlapped and secured to the top 15 by the legs of a U-bolt 21.

Spaced from but adjacent the bottom edge of the body 14 is a third L-shaped ring 22 welded to the body. A plate 23 reinforced with an angle iron 24 is welded to the ring 22. As will be noted from the drawing, the upper end of chain 10 is secured to the bottom plate 23 by means of a U-bolt 25 which extends through the plate 23 and reinforcement 24.

All exposed parts of core 11 are coated with a layer of lead 26. Bolts and other parts not so coated are formed of stainless steel. At junctures of the coated and uncoated parts, seals can be effected by providing rubber washers to prevent access of liquid, in which the core is immersed, to the interior thereof.

In use, it will be necessary to weight the core 11 to prevent its being displaced by buoyancy and this may be effected by introducing sand or other weighting material 27 into the interior of the core through a hand hole 28. A lower hand hole 29 is provided for access to the lower portion of the interior of the core. The lower hand hole or both may be provided with covers 30 bolted or otherwise secured in place, and these covers are lead coated. After covers 30 are closed, the lead coating thereon may be burned to the coating 26.

In operation, the vessel 1 is positioned as desired and the cores 11 and the associated plugs 8 are inserted through the openings 13 in the catwalk 12 and lowered down toward the bottom of the vessel 1. At this point the plugs 8 are properly inserted within the openings 7 which is facilitated by the chain connection of the plug to the core, and the weight of the cores 11 which are of metal construction and which may be filled with sand or other weighting material is allowed to rest upon the plugs 8, thereby forcing the same into tight engagement with the walls of the openings 7. Upon completion of the closure of the openings 7 and the positioning of the cores 11, the hydrosol prepared as hereinbefore described is introduced through the conduit 5 into the vessel 1. After a desired quantity of the hydrosol is introduced into the vessel 1 the supply is shut off and the hydrosol is allowed to remain undisturbed in the vessel 1 for a predetermined period of time until gelation of the hydrosol is effected.

When the hydrosol has set into a hydrogel, the cores 11 are lifted upwardly by means of a suitable hoisting mechanism and after they have been raised a predetermined distance the plugs 8 which are connected to the cores 11 by means of a chain 10 or other lost motion connection are pulled from the openings 7. Upon removal of the cores 11 and the plugs 8 there will be provided a channel down through the hydrogel in the space from which the core was removed and this channel will communicate with the opening 7 directly beneath the same.

After removal of the core 11 and the plug 8, particles of gel may be broken from about the upper edge of the cored channel and dropped down through the channel, opening 7, onto and through the grizzly or sizing screen 7a into the receiver beneath the vessel 1. Also particles of gel may be broken from the upper surface of the gel mass and displaced over to the channel through which it is dropped. Either of these procedures is simpler than the prior art methods of gel removal from setting vessels.

From the foregoing, it will be appreciated that the present invention provides an effective method and operation for the setting of a hydrosol and for the removal of the hydrogel from the setting vessel.

I claim:

1. An apparatus for the setting of a hydrosol comprising a vessel having an opening in its bottom, the area of the opening being small relative to the area of the bottom, a closure for said opening, a core body, for positioning in the space over said opening to form, upon removal, a channel, down through hydrogel in the vessel, communicating with said opening, and a lost motion connection between the lower end of said core and closure.

2. A core body for forming a vertical channel in a mass of hydrogel comprising a hollow imperforate cylindrical body, a lifting bail mounted on the upper portion of said body, a bottom closure in the lower portion of said body, and a filling of weighting material in said body.

3. A core body for forming a vertical channel in a mass of hydrogel comprising a hollow imperforate cylindrical steel body, a lifting bail mounted on the upper portion of said body, a bottom closure in the lower portion of said body, a coating of acid resisting material on said body, and a filling of weighting material in said body.

4. A core body for forming a vertical channel in a mass of hydrogel comprising a hollow imperforate cylindrical steel body, a lifting bail mounted on the upper portion of said body, a bottom closure in the lower portion of said body, a coating of lead on said body, and a filling of weighting material in said body.

5. A closure for an opening in the bottom of a hydrosol setting vessel and a core body for forming a channel through hydrogel in said vessel to said opening comprising a closure member constructed for seating in said opening in the bottom of said vessel, a hollow imperforate cylindrical body having a lower end positionable on said closure, said body having a bottom wall spaced from the lower end thereof to provide a recess in the lower end of said body, and flexible means connected at one end to the upper portion of said closure and at the other end to said bottom wall, said flexible means being of a length sufficient to provide relative movement between the closure and core body.

6. An apparatus for the setting of a hydrosol comprising a vessel having an opening in its bottom, the area of the opening being small relative to the area of the bottom, a closure for said opening, a core body for positioning in the space over said opening to form a channel, down through hydrogel in the vessel communicating with said opening, said core having a diameter throughout its major portion greater than that of the opening and tapering to a diameter at its bottom less than that of the opening to seat upon said closure, and a lost motion connection between the lower end of the closure and the core body.

THOMAS O. TONGUE.

(References on following page)

REFERENCES CITED

The following references are of record in the file of this patent:

UNITED STATES PATENTS

| Number | Name | Date |
|---|---|---|
| 818,752 | Dunn | Apr. 24, 1906 |
| 1,283,000 | Wallace | Oct. 29, 1918 |
| 1,358,662 | Wallace | Nov. 9, 1920 |
| 1,729,068 | Fischer | Sept. 24, 1929 |
| 1,751,301 | Bagley | Mar. 18, 1930 |
| 2,326,523 | Connolly et al. | Aug. 10, 1943 |

FOREIGN PATENTS

| Number | Country | Date |
|---|---|---|
| 230,281 | Great Britain | Mar. 12, 1925 |
| 414,972 | Great Britain | Aug. 16, 1934 |
| 826,732 | France | Apr. 7, 1938 |